United States Patent [19]
Sarkozy

[11] Patent Number: 5,790,774
[45] Date of Patent: Aug. 4, 1998

[54] DATA STORAGE SYSTEM WITH DEDICATED ALLOCATION OF PARITY STORAGE AND PARITY READS AND WRITES ONLY ON OPERATIONS REQUIRING PARITY INFORMATION

[75] Inventor: Andras Sarkozy, Nashua, N.H.

[73] Assignee: Storage Computer Corporation, Nashua, N.H.

[21] Appl. No.: 652,637

[22] Filed: May 21, 1996

[51] Int. Cl.[6] ........................................ G06F 11/00
[52] U.S. Cl. ........................................ 395/182.04
[58] Field of Search ................. 395/182.04, 185.07, 395/441, 497.01, 497.02, 497.03, 404; 371/40.4, 51.1; 364/965.8

[56] References Cited

U.S. PATENT DOCUMENTS

| | | | |
|---|---|---|---|
| 4,761,785 | 8/1988 | Clark et al. | 371/51 |
| 5,197,139 | 3/1993 | Emma et al. | 395/400 |
| 5,257,367 | 10/1993 | Goodlander et al. | 395/600 |
| 5,412,661 | 5/1995 | Hao et al. | 371/10.1 |
| 5,537,534 | 7/1996 | Voigt et al. | 395/182.04 |
| 5,537,567 | 7/1996 | Galbraith et al. | 345/441 |
| 5,542,065 | 7/1996 | Burkes et al. | 395/441 |
| 5,564,116 | 10/1996 | Arai et al. | 395/182.05 |
| 5,583,876 | 12/1996 | Kakuta | 371/40.4 |
| 5,621,882 | 4/1997 | Kakuta | 395/428.04 |
| 5,650,969 | 7/1997 | Niijima et al. | 365/200 |

*Primary Examiner*—Robert W. Beausoliel, Jr.
*Assistant Examiner*—Stephen C. Elmore
*Attorney, Agent, or Firm*—Davis and Bujold

[57] ABSTRACT

Table Vectored Parity (TVP) of the present invention is a new method for the allocation of parity check information in multi disk storage systems. This technique permits an optional selection by the end user to store parity check information on a subset of any number of disks ranging from 1 to N, where there are N disks in the system.

6 Claims, 9 Drawing Sheets

5,790,774

DATA STORAGE SYSTEM WITH DEDICATED ALLOCATION OF PARITY STORAGE AND PARITY READS AND WRITES ONLY ON OPERATIONS REQUIRING PARITY INFORMATION

CROSS REFERENCES TO RELATED APPLICATIONS

The present patent application is related to: U.S. Pat. No. 5,257,367 to Goodlander et al. for a Data Storage System With Asynchronous Host Operating System Communication Link, filed on Jul. 17, 1990 as U.S. patent application Ser. No. 544,127 and issued on Oct. 26, 1993 and assigned to the assignee of the present patent application.

FIELD OF THE INVENTION

The present invention relates to an improved system for storing data and parity information in a mass storage system associated with a data processing system and, in particular, a method and system for storing parity information in flexibly allocated dedicated mass devices to enhance data and parity access times.

BACKGROUND OF THE INVENTION

The increased power and speed of contemporary computer systems has resulted in a corresponding demand for significantly increased mass storage devices, however, are characterized by relatively low data access and transfer rates compared to the computer systems with operate with the data and programs stored therein, and the data transfer rate between the mass storage systems and the host computer systems may be further limited by the data transfer rates of the buses interconnecting the units in the system. As a consequence, and although the mass storage capabilities of host computer systems has been increased significantly, the speed of data read and write access has not increased proportionally but has remained a problem.

While there have been many attempts in the prior art solve the problem of data access speed for mass storage systems, they have typically taken the form of increasing the number of disk drives, for example, to store related data items and their associated parity information across several drives in parallel and thereby overlapping the initial data access time to each drive and increasing the efficiency the mass storage system and the associated host computer system. In many such systems, such as that described in U.S. Pat. No. 5,257,367, the storage system management unit is connected to the host computer system in the same manner as a conventional disk drive, and through a conventional disk drive controller normally present in the host computer system, to appear to the host computer system as a conventional disk drive, although with significantly increased storage space.

Most mass storage devices, however, are characterized by relatively low data access and transfer rates compared to the computer systems with operate with the data and programs stored therein, and the data transfer rate between the mass storage systems and the host computer systems may be further limited by the data transfer rates of the buses interconnecting the units in the system. As a consequence, and although the mass storage capabilities of host computer systems has been increased significantly, the speed of data read and write access has not increased proportionally but has remained a problem.

While there have been many attempts in the prior art to solve the problem of data access speed for mass storage systems, they have typically taken the form of increasing the number of disk drives, for example, to store related data items and their associated parity information across several drives in parallel and thereby overlapping the initial data access time to each drive and increasing the efficiency of bus transfers. An extreme manifestation of this approach was found, for example, in the Thinking machines Corporation CM-2 system which operated with 39 bit words, each containing 32 data bits and 7 parity bits, and stored the bits of each word in parallel across 39 disk drives, on bit to each drive. The CM-2, however, was a dedicated special purpose system employing 64 thousand processors in parallel arrays to perform a few specialized array operations and was essentially hardwired into a fixed configuration unsuitable for general usages. In general, however, and while such approaches have provided some increase in data read/write rates, there is a limit to the speed increases provided by such approaches because of other factors effecting all such systems, including the CM-2.

For example, one limiting factor is the need to store data parity information as well as the data, thereby requiring a mass storage system to store two essentially different types of data with very different storage characteristics and very different access requirements. In a typical mass storage system, however, both data and parity information are stored together on the same disk drives, with related data and parity information being spread over several disk drives to overlap and thereby reduce the initial read/write disk access times, in a method commonly referred to as "striped"parity. Data and parity information, however, are usually stored in units of fixed sizes, parity information more so than data itself, but the units are of very different sizes while the disk drives are formatted to optimally store one type of information, typically the data. As a result, the disk drives operate inefficiently for storing the parity information as there is a significant amount of wasted space on the disk drive. The waste spaces, however, must still be traversed and search when reading or writing data, thereby slowing the data transfer rate. Further, the great majority of read or write operations are of data and parity information is, in fact, rarely used. As a consequence, while many system do not require that parity be read with data on each read, other system do require reading of both data and parity and, in such, systems, such disk and bus time is used in transferring parity information that is generally not used, further slowing the transfer of data.

The present invention provides a solution to these and other problems of the prior art.

SUMMARY OF THE INVENTION

Table Vectored Parity (TVP) of the present invention is a new method for the allocation of parity check information in multi disk storage systems. This technique permits an optional selection by the end user to store parity check information on a subset of any number of disks ranging from 1 to N, where there are N disks in the system.

Currently available systems—usually referred to a parity striping systems or RAID level 5—require that parity check information be stored on each and every drive in the system. TVP allows any number of drives to be parity drives.

In addition, the RAID 5 techniques for partitioning this parity data use a much smaller size than by TVP and they keep data and parity data in the same tracks.

This results in inefficient data transfers because either the data from a track or the parity is wanted by definition both the data and the parity from the same track is not wanted (parity is only useful if it can correct a failure on a different disk). TVP, on the other hand, is designed to fill complete tracks and complete cylinders with parity information. This provides more efficient transfers and less rotational delays.

Another distinction is that in RAID 5 parity striping, 1/N% of the information on each disk is parity information. Hence, 1/N% of the time that the disk system is seeking to READ and WRITE data it is traveling over "wasted" space. This occurs on each drive in the system. Under TVP, however, the parity can be on the minimal number of drives (typically 5 or 6 out of 27 or 30 drives) and thus elongated seek times do not occur as frequently as with simple parity striping.

TVP which the user declares at installation time how many of the data drives should contain a portion of parity information. The RAID 7 Operation System (OS) will size the drives at installation time and allocate the appropriate number of cylinders and tracks. At the same time it will create a software table for the purpose of managing the vector parity addresses which correspond to the associated data addresses. READs and WRITEs are managed in real time by the OS using the vectored addresses to READ and WRITE parity information.

Significant, also in the TVP approach is how data maps a virtual address space to physical drives. Every disk array has some kind of virtual address space. However, the other arrays deal with the address space on a drive sector by drive sector. The TVP approach deals with the address space at the BYTE LEVEL.

To summarize, TVP is more efficient in eliminating rotational delays, more efficient in minimizing transfers by obviating unnecessary smaller transfers, more efficient in eliminating unnecessary extensions on seeks times. In a word, it is a faster parity creation and management process.

The byte unit of physical to logical addressing makes it possible to map different sector sizes from different hosts into the same physical array. It also provides a capacity advantage because storage can be managed more efficiently, as any size sectors are possible owing to the lower definition of a byte unit of size.

The present invention is directed to a method and a mechanism for improved performance of a system having mass storage devices wherein the system includes a host processor including memory and disk management facilities and a disk platform connected from the host processor and controlling a plurality of disk drive units comprising the mass storage devices.

According to the present invention, the parity information associated with each data item is stored separately and independently of the data, with a data set of the disk drives being selectively allocated for storing the data and a parity set of the disk drives being selectively allocated for storing the associated parity information. The system disk management facility assigns and configures the disk drives during system initialization and stores information regarding the storage characteristics of each disk drive.

The memory management facility performs logical to physical address translation operations, including storing information identifying physical addresses, such as the disk drive and location therein, of the data and associated parity information comprising each data item referenced by the host computer during its operations. The memory management facility, using information from the disk management facility translates each logical address referring to a data item into a physical data address of the data thereof and a physical vector parity address of the associated parity information and provides the physical data address or the physical parity information address or both to the disk platform, depending upon whether the current operation involves parity information, together with a disk operation command as determined by the current operation. The disk platform responds by reading or writing the data and/or the parity information, depending upon the requirements of the current operation. As a consequence, the parity information associated with the data of a data item is read or write accessed only if the current operation requires an operation on parity information.

In further aspects of the present invention, the memory management facility further includes a lookaside table for storing the physical addresses corresponding to previously translated logical addresses, and the allocation of disk physical addresses to logical addresses is on a per byte basis.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF THE INVENTION

The following will first describe two implementations of mass storage systems and host computer systems in which the present invention may be implemented and used, the second being a significant improvement over the first and being the subject of U.S. Pat. No. 5,257,367, and will then describe the present invention.

A. General Description of Prior Art Host Computer Systems With Associated Mass Storage Systems (FIGS. 1 through 6) as Described in the Above Referenced Patent A given system's overall performance capability is the result of the integration of a number of independent technologies whose individual growth in performance/capability over time differs markedly from each other.

Figure 1:
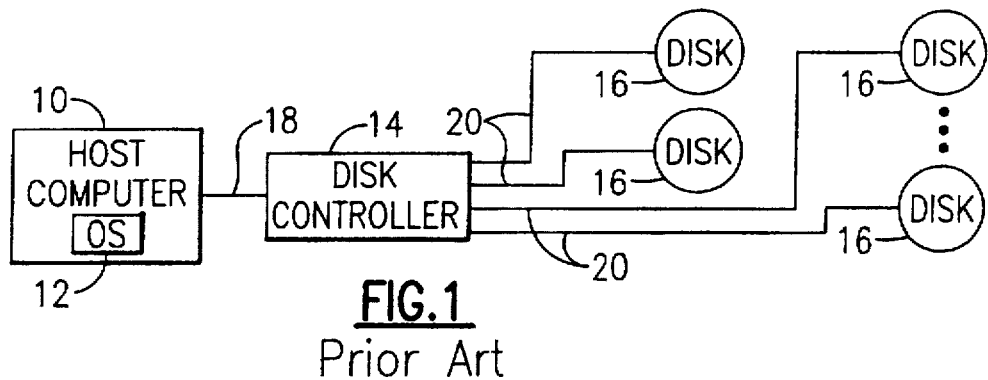
FIG. 1 illustrates an improved system in which the present invention could be implemented.

FIG. 1 shows a typical prior art computer system employing disk drives for storage. The host computer 10 (i.e. the one interfacing with the computer operators) includes an operating system 12. As known to those skilled in the art, the operating system is a set of computer programs that run continuously while the computer has its power on. The operating system controls all the functions of the computer including requests for operating portions of the memory, error response, and input/output (I/O) requests. The computer 10 has a disk controller 14 connected thereto and the disk controller 14, in turn, is connected to four disk drives 16. In use, an applications program (not shown) makes a request for data from the operating system 12. The location of the data is completely transparent to the applications program; that is, the applications program has no idea where the data is physically located. At system setup time (or possibly subsequently through operator input), the locations of the data is stored in tables (not shown) which are part of or accessible by the operating system 12. Knowing from the tables that the requested data is on a particular disk drive 16 at a particular track between starting and ending sectors, the operating system 12 outputs a disk read request on line 18 to the disk controller 14. The disk controller 14, in turn, then issues a read request to the appropriate disk drive 16 on its connecting line 20 which causes the read head (not shown) within the disk drive 16 to move to the designated track and then read data and output it to the disk controller 14 on the line 20 from the starting sector to the ending sector. When the data has been received by the disk controller 14 (into an appropriate cache/buffer memory, the operating system 12 is informed by an appropriate signal on line 18.

As can be appreciated, if one wants the operating system 12 to do more, the programming of the operating system 12 must get more complex. Given the present state of complexity of the typical operating system and the capabilities of the average systems' computer programmer with respect to such esoteric matters as re-entrant coding and "run anywhere" coding, to ask the operating system to do more is to ask for trouble because of information handling bottle necks.

There is also the problem of system overhead. If you ask the operating system to do more, it will add to the overhead of the operating system and, therefore, to the overhead of every program which accesses it.

For any given OS and computer system, implementation of any real time function will cause the OS to consume a large portion of the computing resource, rapidly degrade the performance of the system from the user's perspective, and severely limit the work product computing potential.

As those skilled in the art will also readily recognize and appreciate, even if the penalty of added overhead is made to the operating system so as to achieve the convenience in other areas, such an approach includes no means of ever reducing the added overhead.

File Maintenance, Management, and Archival Copy (FMMAC) are tasks essential to the reliability, usability, and integrity of computer stored data. These tasks are now performed by Operating Systems functions, separately run applications programs, operator or system manager manual intervention, or a combination of these techniques.

These FMMAC tasks almost always require a manual operator decision to initiate and complete. Often they require the computer system to be taken off-line and therefore not available to users during the time it takes to complete abated by duplicating hardware systems at great economic cost.

In the above-referenced patent, the system of which is described next herein below as illustrative of the systems in which the present invention may be embodied, a high-speed, high-capacity, fault-tolerant, error-correcting storage system was disclosed which provides a solution for many of the above-described needs of modern computer systems (both military and commercial).

An improved overall computer system employing both disk and near line archival storage and typical of the systems in which the present intervening events such as device failures or rush jobs that take priority over FMMAC tasks.

Continuous duty computer systems such as Real Time monitoring and control systems or On-line Transaction Processing systems present additional barriers to FMMAC tasks. In theory, no time is available to perform the tasks. In reality, such systems or files are simply shut off for FMMAC. In "Critical Mission" applications (for example Nuclear Power Plant Monitoring and Control) the FMMAC problem is often abated by duplicating hardware systems at great economic cost.

In the above-referenced patent, the system of which is described next herein below as illustrative of the systems in which the present invention may be embodied, a high-speed, high-capacity, fault-tolerant, error-correcting storage system was disclosed which provides a solution for many of the above-described needs of modern computer systems (both military and commercial).

Figure 2:
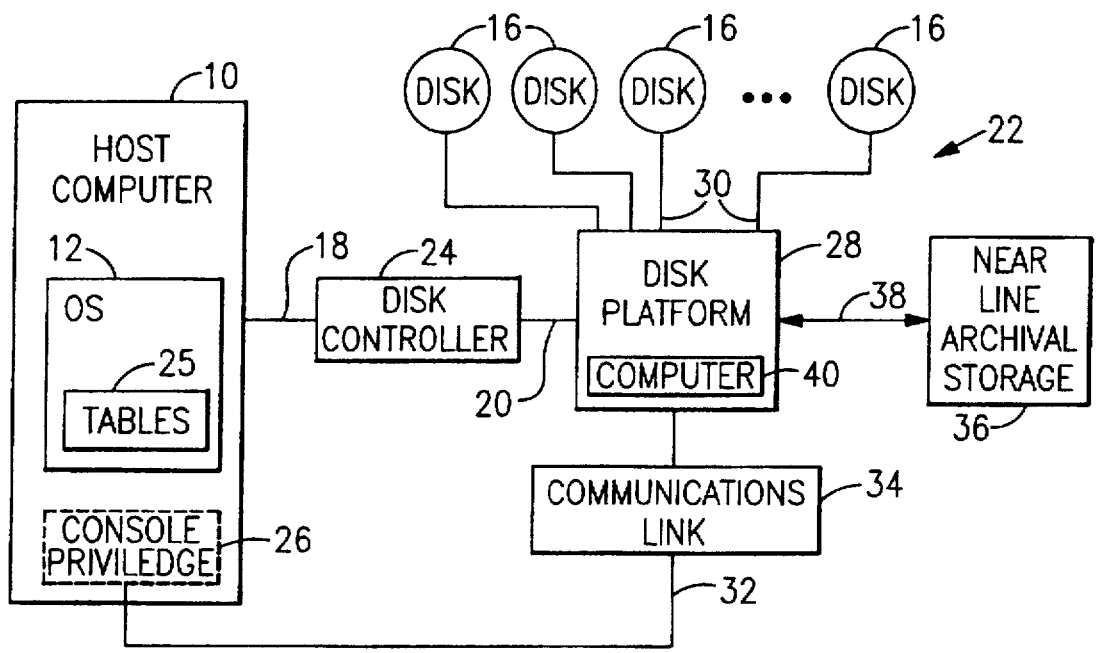
FIG. 2 is a simplified block diagram of a platform-based disk memory system that could implement the present invention.

An improved overall computer system employing both disk and near line archival storage and typical of the systems in which the present invention may be employed is shown in FIG. 2 where it is generally indicated as 22. The system 22 has a host computer 10 containing an operating system 12 with its tables 24. There is also a console privilege interface 26 by means of which outside user consoles (not shown) can be used to access the host computer operating system 12. There is once again a disk controller 24 since there is no change to the operating system 12 and the operating system 12 is set up to interface with the disk controller 24. Rather than being connected directly to the disk drives 16 as in the prior art approach of FIG. 1, however, the single line 20 from the disk controller 24 is connected to an intelligent disk platform 28. The disk platform 28 is then connected to interface with the disk drives 16 through lines 30. Additionally, the disk platform 28 has a bi-directional connection 32 through a communications link 34 to the console privilege interface 26. In the preferred embodiment as applicable for large-scale storage systems, there is also near line archival storage apparatus 36 connected to the disk platform 28 through line 38. To perform within the system 22 of this invention, the near line storage apparatus 36 should be of an automated variety selected from any of a number well known in the art where off-line storage media are loaded for reading and writing on request by automated mechanisms so as to avoid the necessity of operator intervention.

To accomplish its unique improvements over the prior art, the disk platform 28 includes its own computing capability as represented by the computer block 40. As will be seen shortly, the computer 40 may, in fact, comprise multiple processing units; but, for the present it is sufficient to note that the disk platform 28 is not the "dumb" controller 14 of the prior art. Employing the bi-directional connection 32 through the communications link 34 to the console privilege interface 26, the computer 40 can find the location of data from the tables 24 of the operating system 12. The location of data within the disk drives 16 or the near line archival storage apparatus 36 is, therefore, transparent to both the operating system 12 and the applications programs requesting it. If requested data is located on the near line archival storage apparatus 36, it can be retrieved automatically and then be relayed to the operating system 12 just as if it was on one of the disk drives 16. More importantly, the preferred computer 40 is of the self learning variety which learns through experience. Thus, for example, if a particular file from the near line archival storage apparatus 36 is used at a given time and/or day each month (as in preparing a payroll), the logic of the computer 40 will learn that from experience and begin loading the file from the near line storage apparatus 36 in anticipation of the expected request so that when the request is made, the file is already read in and available for use. Thus, the overall system performance of the system 22 is not only improved over the prior art for a given level of file location transparency to the users; but, additionally, the overhead drops as the system learns the repeated patterns of use associated with its users. In addition, whereas the prior art approach of FIG. 1 could only do system and equipment diagnostics by taking the computer 10 off-line or by increasing the complexity and overhead of the operating system 12 once again by having the operating system 12 perform such functions in a background mode, the storage system and equipment diagnostics are now performed by the computer 40 located within the disk platform 28 on a continuing and time-available basis. As will be seen from the description which follows, when the disk drives 16 have a fault or error, any errors and problems found can be corrected or at least pin pointed for operator correction and replacement without taking the system 22 off line or causing any significant degrading of the performance thereof.

Figure 3:
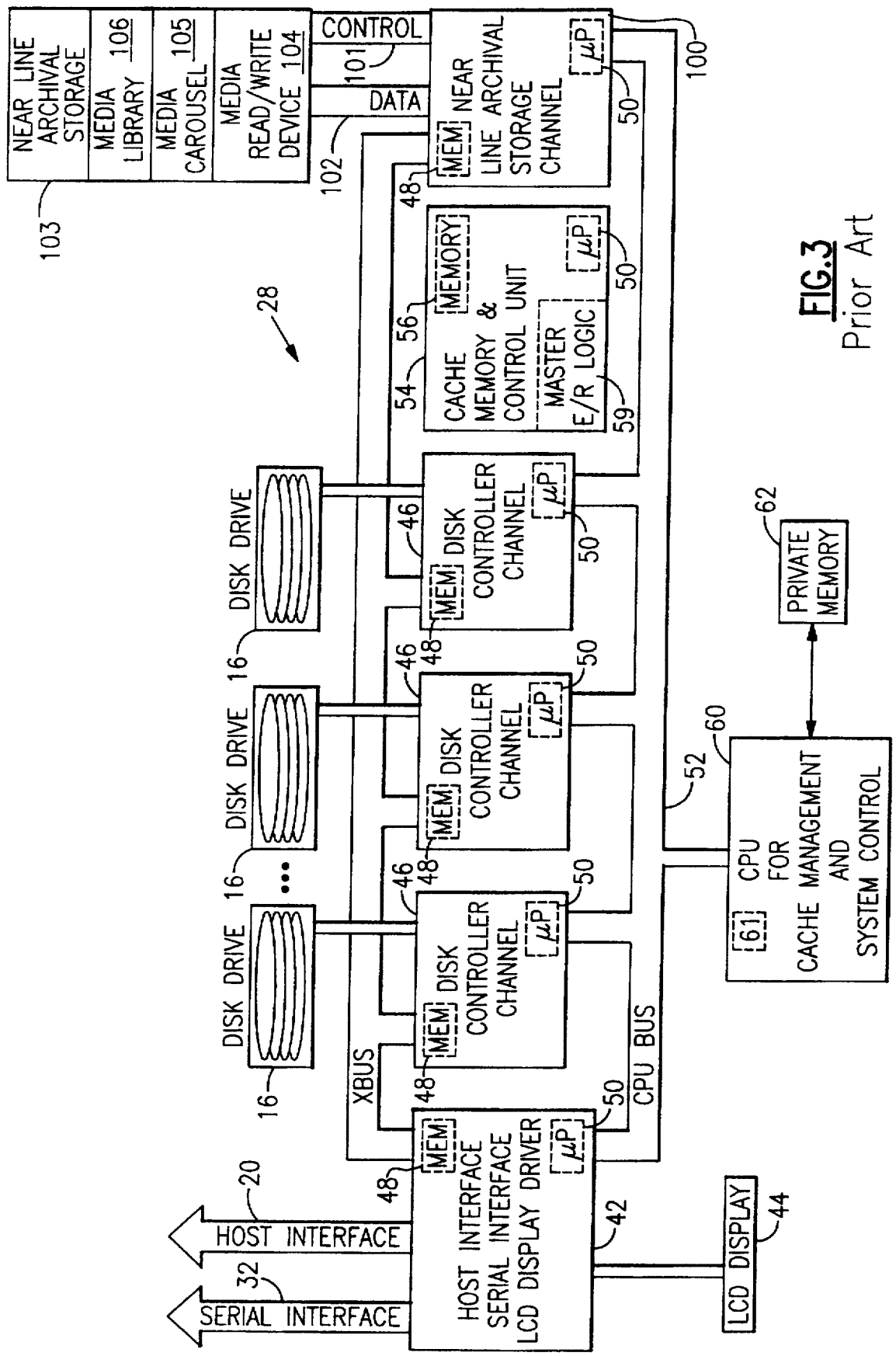
FIG. 3 is a simplified block diagram of the disk memory platform of the system of FIG. 2.

Having thus described a preferred overall system approach to storage systems, attention will now be turned to a preferred construction of the disk platform 28. That system employed individual disk channel controllers for respective ones of the disk drives 16 and each of the disk channel controllers included a cache/buffer memory. All the disk channel controllers were controlled by control signals from a common control computer and both data and the control signals employed the same bus. As depicted in FIG. 3, the preferred disk platform 28 of this disclosure has been restructured to greatly improve the performance while, at the same time, also substantially reducing the complexity whereby the reliability is increased and the implementation thereof is greatly simplified with attendant known benefits.

In FIG. 3, line 18 is labeled as the "SERIAL INTERFACE" and line 20 is labeled as the "HOST INTERFACE". In a tested embodiment, the SERIAL INTERFACE of line 18 is an RS-232 interface and the HOST INTERFACE of line 20 is a SCSI (small computer system interface) interface. This choice was as a result of the availability of commonly-used equipment for use in testing only and those skilled in the art will readily recognize and appreciate that the same techniques being described here by way of example could be accomplished employing other hardware interface methods and apparatus known in the art, or yet to be developed. In this regard, the improvements of this invention are both universal and adaptable. The two lines are connected to a interface and driver unit 42 which provides the host interface, serial interface, and LCD display driver functions as indicated therein. The logic and apparatus of interface and driver unit 42 is also connected to a display 44. The display 44 is not an absolute requirement; but, is preferred so that messages can be provided to an operator as, for example, in the event of a detected malfunctioning disk drive 16 which has been removed from operation and should be replaced in order to restore full system capability.

There are a plurality of disk controller channels 46 connected to respective ones of a plurality of disk drives 16. It is preferred for error detection and correction optimization that at least one extra disk controller channel 46 and associated disk drive 16 be up and running at all times to be used as a "hot" replacement in the event of a detected error or potential problem. Thus, it is preferable to dynamically substitute a disk channel and let the problem channel be fixed by service personnel off-line. When repaired, that channel can then become the hot replacement. Each of the disk controller channels 46 again has a cache/buffer memory 48 associated therewith. Where the memory of the disk controller channels performed the dual function of a memory buffer into which to read and from which to write with respect to the disk drive connected thereto and a cache memory, the memories 48 of this invention in general perform the buffer function. It is preferred that the memories 48 be sized to be involved in more than one transfer at a time so that at least one stream of data can be read into the memory 48 while another stream of data is being written out of the memory 48. In many systems of the prior art, the disk controller channels were dumb or had little memory capacity; that is, they did not include any computing power. Thus, the disk controller channels had to be fed a stream of low level commands, resulting in a large amount of non-data traffic sharing the bus with the data. That, of course, reduced the overall throughput of data along the bus. In the "intelligent" disk controller channels 46, the disk controller channels 46 are provided only with high level command signals and accomplish the balance of the indicated read and write functions internally with the micro-processors 50. Thus, the amount of non-data traffic on the CPU bus 52 is greatly reduced, allowing more available time for the transfer of data—which, of course, should be the primary function thereof for optimum system performance.

A significant element of this application is the cache memory and control unit 54. While the memories 48 of the disk controller channels 46 in the tested embodiment are each 8K bytes in size, the cache memory 56 of the cache memory and control unit 54 is 16M bytes. The cache memory and control unit 54 also includes its own micro-processor 58 and master error recovery logic 59.

Finally, the preferred disk platform 28 includes a central processing unit (CPU) 60 with its own private memory 62. The CPU 60 is employed for cache management and system control functions in a manner to be described shortly. As shown in FIG. 3, the above-described components with the exception of the CPU 60 are interconnected to communicate with one another by the XBUS 64 and interconnected to communicate with the CPU 60 by means of the CPU bus 52.

As mentioned above, not only is the transfer of data between the memories 48 and the disk drives 16 done asynchronously as in the prior disclosure; but, additionally, transfers into and out of the cache memory 56 is done asynchronously. Because of its size (i.e. 16M bytes) the cache memory 56 can be employed for the transfer of multiple requests from the host computer 10 at one time. Because of access times of the disk drives 16, lengths of transfers requested, and/or data portions already in the cache memory 56, the requests to read and write data from the CPU 60 to the disk platform 28 may not be responded to in the order received. As soon as a request is completed, no matter its position in the request sequence, the CPU 60 is informed that it is completed. Thus, throughput as seen by the host computer 10 is greatly improved.

The CPU 60 includes an embedded array disk operating system 61 and employs its private memory 62 to keep track of the contents of the cache memory 56 so that it can respond optimally to requests from the host computer 10. The CPU 60 in this system only issues high level commands to the disk controller channels 46 so that the multiple, low-level command approach, which occupied valuable time on the CPU bus 66, is eliminated. The micro-processors 50 each contain firmware that not only performs the actual low-level command steps required to do disk transfers; but, in addition, performs continuing self-testing of the individual controller channel on a time-available basis to assure that the components are continuing to work properly. Should such self-check indicate a potential problem, the CPU 60 then conducts further testing of the subject disk controller channel 46 to see if an on-line "hot" spare disk drive 16 or disk controller channel 46 should be employed while the malfunctioning unit is flagged for work on the display 44 and removed from use temporarily.

By putting the CPU 60, by way of micro-processor 58, in complete charge of transfers between the memories 48 and the cache memory 56 the problem of dealing with bus arbitration on the XBUS 64 is also eliminated. That, of course, has many beneficial effects such as increased reliability, increased throughput, and simplicity of implementation.

Figure 4:
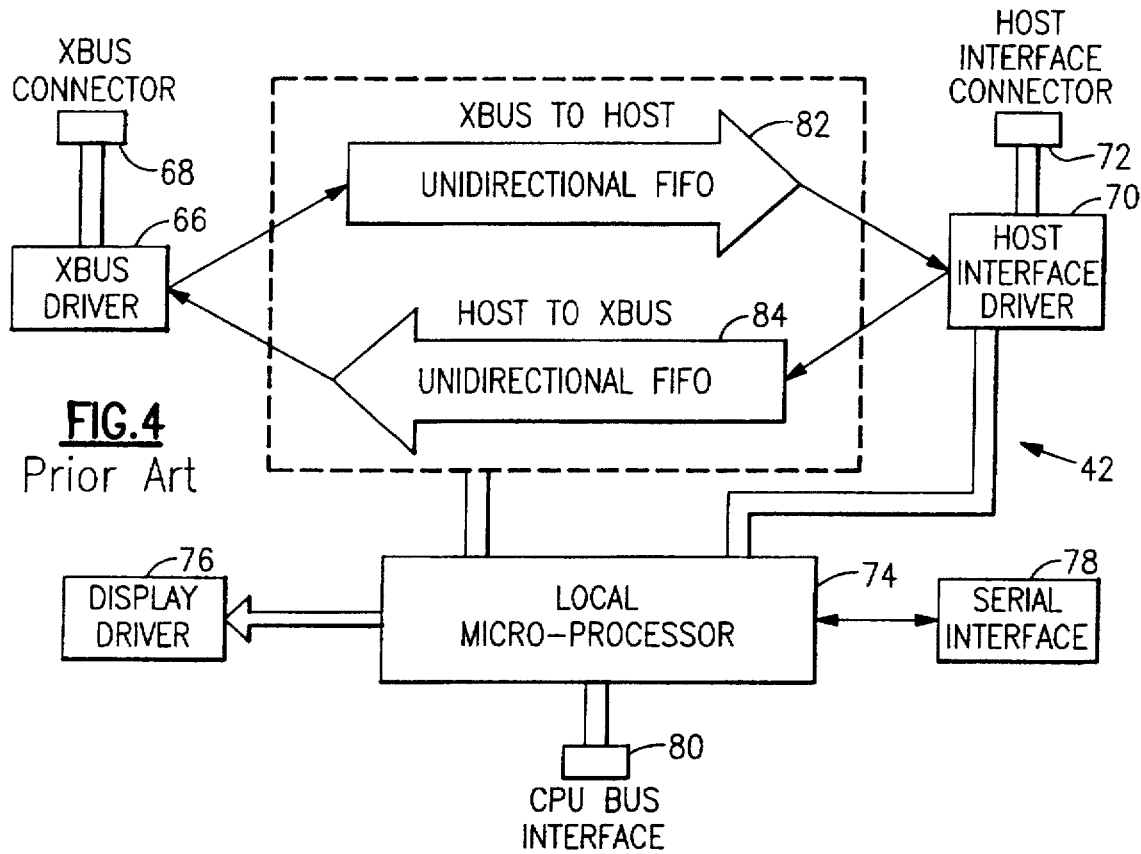
FIG. 4 is a simplified block diagram of the host interface block of the disk memory platform of FIG. 3.
Figure 5:
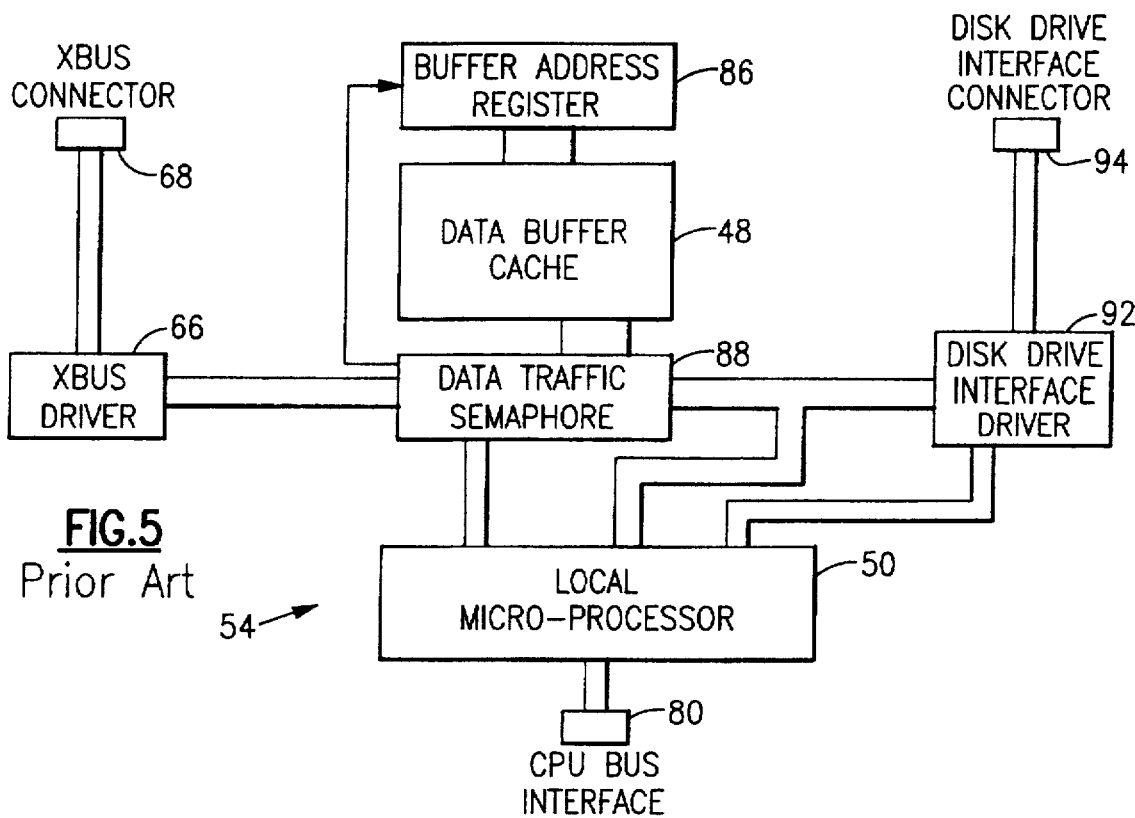
FIG. 5 is a simplified block diagram of the one of the disk controller channels of the disk memory platform of FIG. 3.

To get a better idea of the operation of the disk platform 28 of this invention, we will now turn to FIGS. 4 and 5 with particularity. FIG. 4 shows further details of the interface and driver unit generally labeled as 42 while FIG. 5 shows further details of one of the disk controller channels 46. With reference first to FIG. 4, there is an XBUS driver 66 connected to the XBUS 64 with a connector 68. There is also a host interface driver 70 (SCSI in the tested embodiment) connected into line 20 back to the host computer 10 by a connector 72. As with the other elements, there is also a local micro-processor 74 to control the operation of the elements of the interface and driver unit 42. The micro-processor 74 interfaces with a display driver 76 (which is connected to the display 44) and a serial interface driver 78 (which is connected to the serial interface on line 18). All the driver elements are well known to those skilled in the art and will be chosen according to the type of device with which they must interface. The micro-processor 74 is also connected to the CPU bus 52 with connector 80. The heart of the interface and driver unit 42 and most important part thereof is a pair of unidirectional FIFOs 82 and 84. Under the control of the local micro-processor 74, FIFO 82 receives and transmits data from the XBUS 66 to the host computer 10. Similarly, FIFO 84 receives and transmits requests and data from the host computer 10 to the XBUS 66. Thus, bi-directional transmissions can take place between the XBUS 66 and the host computer 10. This is another feature of this embodiment which improves the overall throughput of the system 22.

The disk controller channels 46 depicted in FIG. 5 also includes an XBUS driver 66 and a disk drive interface driver 92 connected to the associated disk drive 16 with their associated connectors 68, 94. Similarly, the local micro-processor 50 is connected to the CPU bus 52 with a connector 80. In addition to the data buffer memory 48, there is a buffer address register 86 which controls the locations in the memory 48 which are accessed and a data traffic semaphore 88 which operates in a manner readily apparent to those skilled in the art to control access to and from the memory 48 under the control of the micro-processor 58. Thus, it is the data traffic semaphore 88 which actually inserts the addresses into the buffer address register 86. The data traffic semaphore 88 must be present to prevent simultaneous access to the memory 48 by both the XBUS 64 (and elements connected therethrough) and the host computer 10. Such devices are well known and employed in the computing art for that purpose as any attempt to simultaneously read from and write into a memory location can cause irreversible errors.

The near line archival storage channel 100 is controlled in the same manner as disk controller channel 46 through microprocessor 50 and cache/buffer memory 48 and contains the logic to control by way of control bus 101 the near line archival storage 103 and its individual elements 104, 105 and 106 to read and write data by way of data bus 102. Data read from near line archival storage 103 is held in cache memory 56 or on disk drives 16 and is accessed by the host computer with sector numbers beyond the physical limits of disk drives 16 creating a virtually boundless storage capacity.

Figure 6:
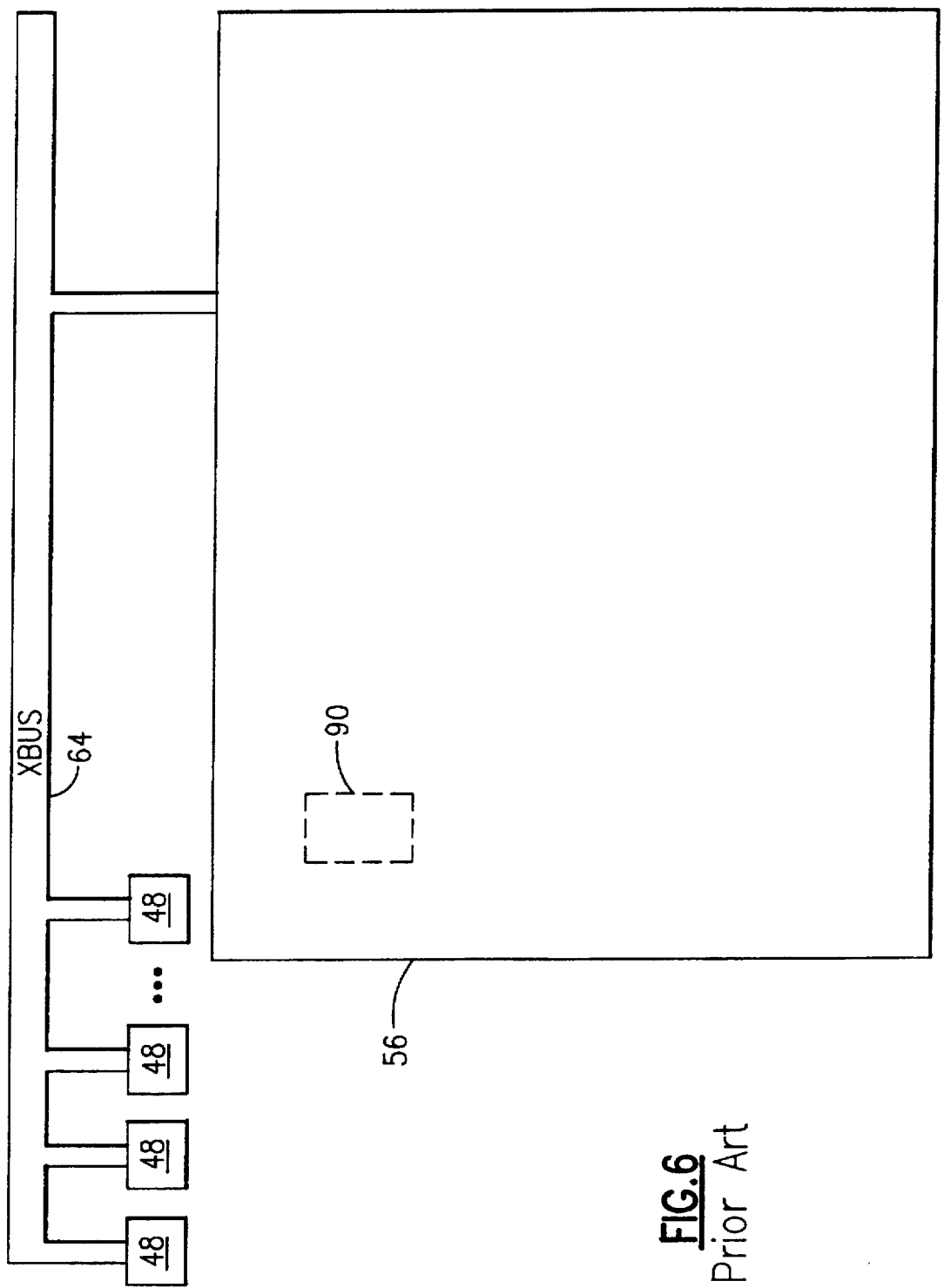
FIG. 6 is a simplified drawing employed for an example to show the dual asynchronous operation of the system of FIG. 2.

Having thus described the construction and operation of the system 22 in general, a more specific example of its unique mode of operation will now be described with reference to FIG. 6. For simplicity, FIG. 6 depicts in simplified form only the cache/buffer memories 48 in the channels and the cache memory 56 as connected by the XBUS 64. Assume that a request has been made by the host computer 10 to read data. The disk platform 28, of course, knows (or can determine) the location of the data in the disk drives 16 through its above-described access to the tables 24 in the host computer 10. According to fault tolerant techniques, the data (and its parity bits) are spread across the disk drives 16. From the contents of its private memory 62, the logic in the CPU 60 knows the present contents of the cache memory 56. Anything that is already in the cache memory 56 will not be re-read, of course, which is thorn a consideration of the elements and their method of operation as described above that the single cache memory 56 of substantial size as employed in this embodiment effect a vast improvement in simplicity and efficiency of operation (i.e. speed). Because of its size, the cache memory 56 will actually self-optimize the data it retains in cache over time so as to minimize the number of data transfers required with the disk drives. In this regard, it is important to recognize that the parity bits associated with data are contained in separately transferable locations on the disk drives 16. Thus, over the course of time the most used data and their parity bits will be virtually permanent residents of the cache memory 56 and will only be written to the disk drives 16 for back-up purposes on a time-available basis in a background mode by the micro-processor 58. The impact of this on the overall performance of the system 22 should not be overlooked or minimized. Consider, if there are eight disk drn asynchronously transfers the data segments into their appropriate location within the assigned buffer space 90. When the entire data of the request is in the assigned buffer space 90, the micro-processor 58 transfers it to the host computer 10 through the FIFO 82 described above. A write operation, of course, operated in much the same manner, except that data flow is in the opposite direction.

While only shown in simplified representation in FIG. 6, it may be appreciated therefrom and from a consideration of the elements and their method of operation as described above that the single cache memory 56 of substantial size as employed in this embodiment effect a vast improvement in simplicity and efficiency of operation (i.e. speed). Because of its size, the cache memory 56 will actually self-optimize the data it retains in cache over time so as to minimize the number of data transfers required with the disk drives. In this regard, it is important to recognize that the parity bits associated with data are contained in separately transferable locations on the disk drives 16. Thus, over the course of time the most used data and their parity bits will be virtually permanent residents of the cache memory 56 and will only be written to the disk drives 16 for back-up purposes on a time-available basis in a background mode by the microprocessor 58. The impact of this on the overall performance of the system 22 should not be overlooked or minimized. Consider, if there are eight disk drives 16 containing the individual data bits of data and a ninth disk drive 16 containing the parity bits associated therewith, if the parity bits are contained in an unused portion of the cache memory 56 and only written to the ninth disk drive 16 when the eight disk drives 16 are not otherwise involved in an actual data transfer, disk access time to access data is reduced by one-ninth or eleven per-cent. The savings in time could be even more substantial in an instance where one of the eight disk drives 16 containing the data bits is malfunctioning and the parity bits are required to correct any errors in the data stream.

Figure 7:
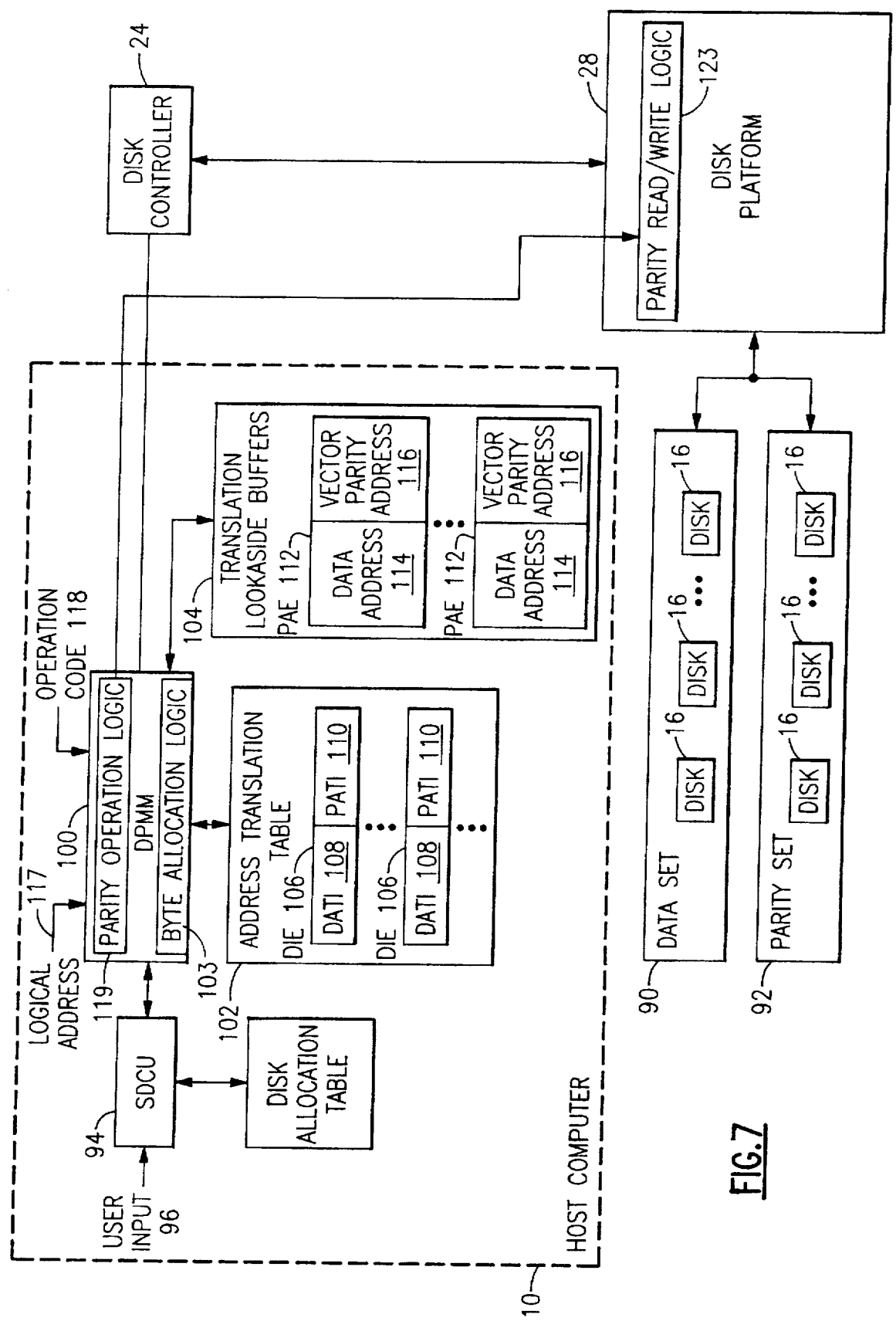
FIG. 7 is a diagrammatic representation of the present invention.
Figure 10:
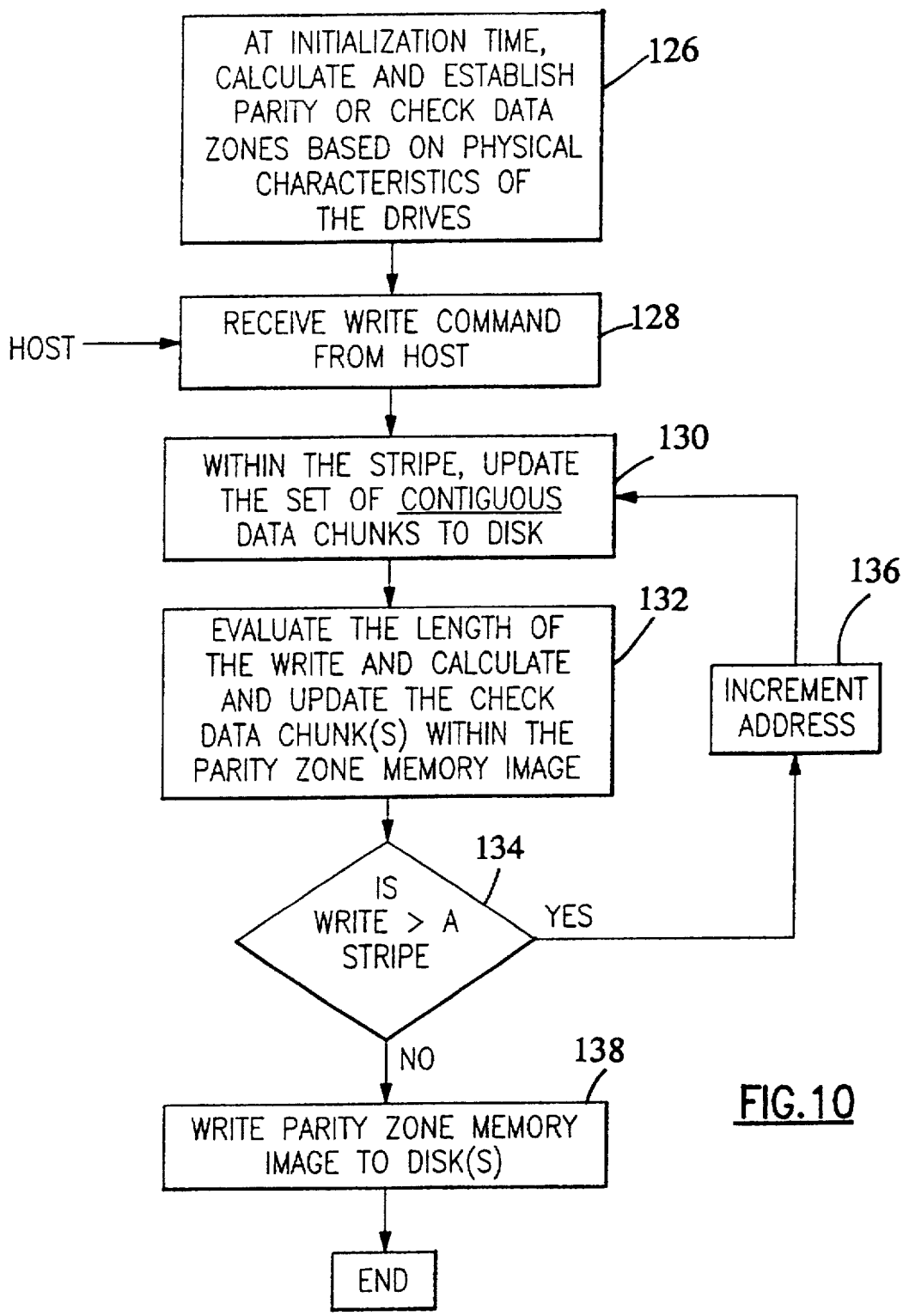
FIG. 10 is a diagrammatic representation of TVP (table vectored parity) of the present invention; and, FIG. 11 is a table of data and parity (P) on one stripe of a storage disk of TVP (table vectored parity) of the present invention.
Figure 11:
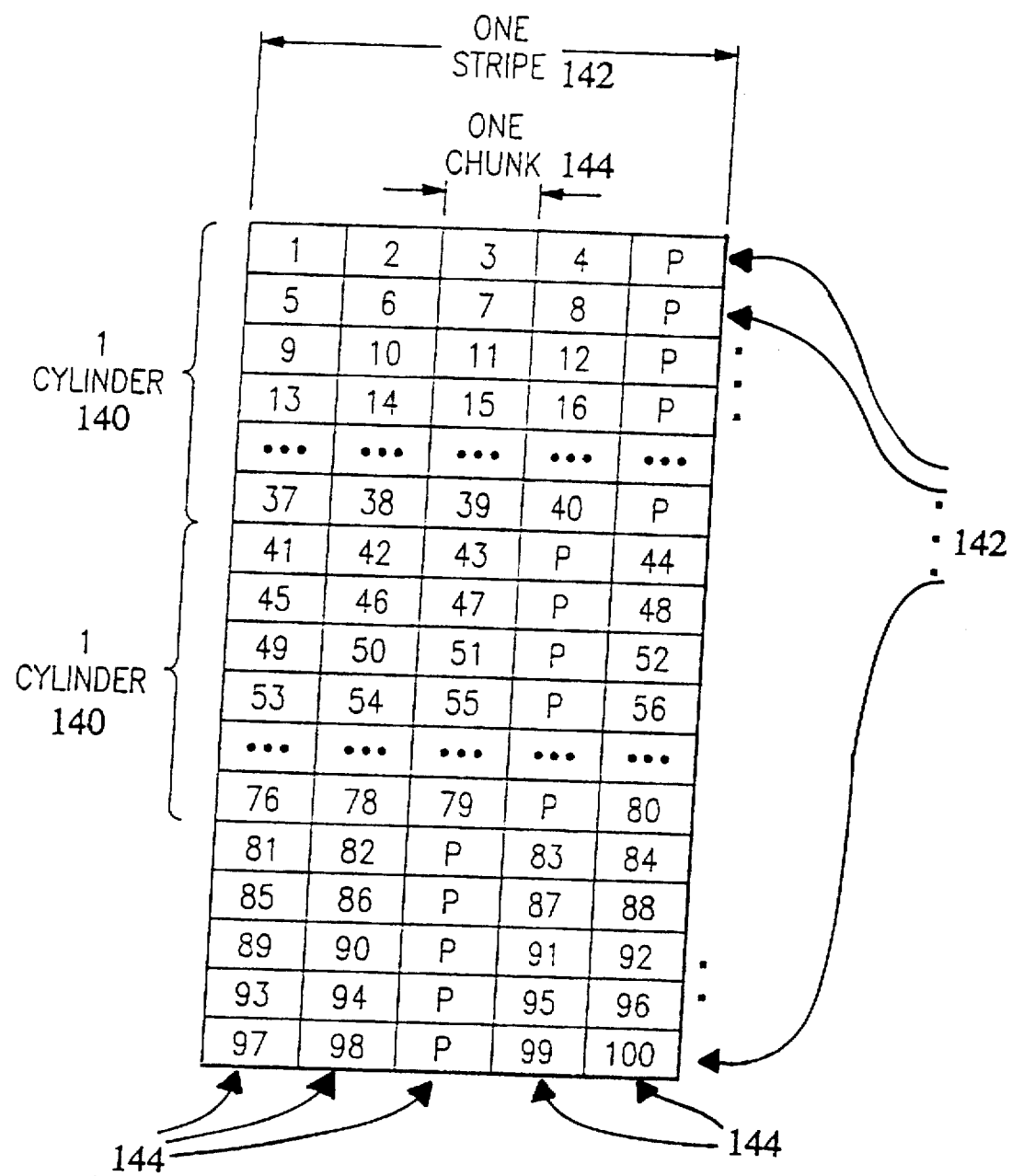

B. Description of the Invention (FIG. 7, 10 and 11)

To properly explain TVP requires a brief reiteration of some aspects of the current StorComp Operating Systems (SOS) as follows.

RAID 7's SOS design owes its roots to a Demand Page Memory System design which is an element of most modern OS designs. This approach makes use of Vitual Memory Technology to allocate and de-allocate memory "pages". RAID 7 employs this methodology. This means that the elements of physical address, logical address, frame numbers, and page tables are used to map each physical address on a specific member drive to a logical or virtual address. Translation Lookaside Buffers (TLBs) are maintained in RAM memory which can be used to point to the address of pages of data which are stored on member drives in the array. A sophisticated and proprietary page management, replacement, and aging methodology, helps optimize "cache hits", "write skips", "write concatenations", and other write optimization techniques.

The operation of the above RAID 7 techniques largely mitigates the parity-write-bottleneck that plagues all earlier RAIDs. RAID 4 technology ignores this bottleneck, and consequently suffers the performance penalty that emanates from the bottleneck. RAID 5 technology attempts to address this bottleneck by rotating the parity information across all member disks. This does not solve the parity bottleneck, it simply delays the problem by involving more disks. RAID 5 in effect addresses the symptom of the problem by distributing data across all drives. Additionally, in using every drive for parity, RAID 5 forces an access penalty equal to 1/N% in unnecessary seek time penalties. For example, if a RAID 5 has 5 drives with parity information on each, then (1 of 5) 20% of all time spent doing seeks for host READs and WRITEs will be moving over parity information which is by definition not of interest and therefore wasting performance time.

RAID 7, through the virtual paging mechanisms, and its parallel architecture of scaleable memory and buffers and dedicated channels, is able to largely mitigate the parity bottleneck. In addition, with RAID 7's Table Vectored Parity approach, it is possible to allocate parity only to the minimum number of drives that actually help improve performance. For example, if there are 27 drives on the system and the optimal number of drives containing parity information were 6, then parity could be stored and access could be vectored to those 6 physical drives. In this way the remaining 21 drives could contain only data and RAID 7 would be able to enjoy the additional benefit of reducing parity contention from a single drive, while at the same time, not incurring a penalty of accesses on all drives.

In addition, there are other important implementation features of TVP that outperform RAID 5 parity striping. Under RAID 5 technology, parity is deposited in related sectors on a rotated basis across the disks. This forces a large amount of inefficient accesses because parity and data share space on the same tracks. Since the host rarely, if ever, wants the data and parity information from the same track on the same disk, this means that many rotational delay times will be wasted in disk accesses. With RAID 7 Table Vectored Parity, on the other hand, it is possible to store parity in deposits which equate to the entire track/cylinder size. This eliminates many rotational delay times for parity accesses as well as data accesses.

Referring to FIG. 7, the present invention is diagrammatically illustrated therein using the system of FIG. 2 discussed above as an exemplary implementation of the present invention. As will be described below, the present invention is implemented in the OS 12's Tables 25 in Host Computer 10 and in related facilities in Host Computer 10, and results in a unique use of Disks 16 to store data and parity information in a manner to overcome the previously discussed problems of the prior art.

According to the present invention, each "data item" stored in Disks 16, wherein a "data item" is comprised of data and associated parity information, is separated into its data and its associated parity information and the data and parity information of each data item are stored separately in Disks 16. Only data is stored a first selectable Data Set 90 of Disks 16 connected from and controlled by Disk Platform 28 that assigned to store data, while the parity information is stored, possibly together with data, in a second selectable Parity Set 92 of Disks 16 that are assigned to store the parity information. Data Set 90 and Parity Set 92 of Disks 16, moreover, do not operate in parallel, or necessarily in conjunction with one another, but instead operate independently of one another so that data is read from or written to Data Set 90 of Disks 16, and possibly certain of Parity Set 92, certain independently of the reading of parity information from Parity Set 92 or the writing of parity information to Parity Set 92.

As such, and as a consequence, the Disks 16 of Parity Set 92 may be formatted in the optimum manner for storing parity information while the Disks 16 of Data Set 90 are formatted in the optimum manner for storing data. Further, and because the Disks 16 of Parity Set 92 are independent of the Disks 16 of Data Set 90, and are addressed and controlled independently of the Disks 16 of Data Set 90, parity information is read from Disks 16 of Parity Set 92 or written to Disks 16 of parity Set 92 only when Host Computer 10 specifically performs an operation on parity information, such as creating or updating the parity information associated with a data item or using the parity information to correct the data of a data item. As a result, most reads from or writes to Disks 16 are reads or writes of data from or to Disks 16 of Data Set 90, so that the Disks 16 of Parity Set 92 are not accessed, thereby avoiding the necessity to traverse parity information when seeking to read data from Disks 16. The average seek time to read or write data is thereby significantly reduced be the time normally required to traverse parity information, thereby significantly reducing the average time required for data reads and write and the time required for data transfers between Host Computer 10 and Disk Platform 28. In addition, the reduction in information being transferred as a result of reading parity information only upon parity related operations reduces the average volume of information stored in cache Memories 48 and 56, thereby freeing capacity in cache Memories 48 and 56 for data and again increasing the average speed of data operations.

In order to accomplish the above operations, it will be apparent that Data Set 90 and Parity Set 92 of Disks 16 must be assigned and controlled separately, but that the data and the parity information must be related to one another. As will be described below, this is accomplished by providing vector parity addresses separate from but related to the data addresses and through which the parity information residing in Parity Set 92 of Disks 16 is addressed in the same manner as, but independently of, the data residing in Data Set 90 of Disks 16.

According to the present invention, these functions are accomplished through Host Computer 10's Tables 25 and certain associated disk management and address translation mechanisms found in Host Computer 10. It will be recognized by those of ordinary skill in the relevant arts that the general functions and structures of these tables and mechanisms are commonly well known in the art and are found in a wide variety of implementations in most computer systems and that the present invention presents instead a new use and operation of such tables and mechanisms. These tables and mechanisms will therefore not be described in detail below, but will be discussed only as sufficient for those of ordinary skill in the arts to understand and implement the present invention.

As illustrated in FIG. 7, the Operating System (OS) twelve programs of Host Computer 10 typically include a System Disk Configuration Utility (SDCU) 94 which controls and manages the initial configuration and formatting of all Disks 16 connected from Host Computer 10. As is well known in the art, the disk drives connected from a host computer can be and are configured and formatted for selected purposes by a system facility such as SDCU 94 at system initialization, and may thereafter be reconfigured and reformatted as necessary, again using SDCU 94. In the present exemplary system, for example, and as described above, Disks 16 are connected to Host Computer 10 through Disk Platform 28 and Disk Controller 24 and SDCU 94 would, in this implementation, perform the initial configuration and formatting of each of Disks 16 through Disk Controller 24 and Disk Platform 28 in the manner usual in computer systems.

As also indicated in FIG. 7, the allocation of Disks 16 to Data Set 90 or to Parity Set 92 is under control of a system user operating through User Disk Allocation Input 96, for example, through a keyboard or user console, and the allocations entered by a user are stored in a Disk Allocation Table 98 which stores, for each Disk 16, its allocation to Data Set 90 or to Parity Set 92. Disk Allocation Table 98 is read at first system initialization by SCDU 94 which, operating through Host Computer 10, Disk Controller 24 and Disk Platform 28, formats and configures each of Disks 16 according to its allocation to Data Set 90 or to Parity Set 92. The disk allocation process may thereafter be repeated at a later time, for example, as system usage or data storage needs change, whereupon the system will be re-initialized again.

It should be noted that the allocation of Disks 16 to Data Set 90 or to Parity Set 92 under user control allows Disks 16 to be re-allocated as system usage or needs change, or as the users gain experience with system performance, or as disks are added to or removed from the system, so as to obtain the optimum allocation of Disks 16 between Data Set 90 and Parity Set 92. It will also be noted that the allocation and dedication of a given Disk 16 to Set 90 or to Set 92 allows more efficient use of the storage space on the Disks 16 of Parity Set 92 and faster parity information access on both reads and writes as the disk drive and controllers have significantly less wasted storage capacity to traverse and search.

As also illustrated in FIG. 7, Host Computer 10 further includes a Demand Paging and Memory Management Facility (DPMM) 100, wherein, as is usual in such systems and as is well understood in the arts, DPMM 100 operates to relate and translate virtual or logical addresses generated by the application and operating systems programs into physical addresses of the corresponding data or program code in the system. As is well understood, the physical addresses may be of locations in system memory or on Disks 16 and, if on Disks 16, may include an identification of the particular Disk 16 and the sector and track thereon. As is well known in the art, the details of when and where in the system addresses are translated from the logical level to the detailed physical level, and the levels of translation performed at each step, depends upon the distribution of "intelligence" and functions among Disk Controller 25, Disk Platform 28 and Disks 16 in a particular system.

For these purposes, and as illustrated in FIG. 7, DPMM 100 maintains an Address Translation Table 102 storing the addressing information necessary to translate logical to physical addresses and a set of Translation Lookaside Buffers 104 that operate as a cache mechanism to store previously translated addresses, thereby avoiding the calculation operations necessary to translate a logical address to a physical address upon each reference.

According to the present invention, parity information is accessed in the same manner as data, but separately from data and dependent upon the particular operation being executed by Host Computer 10. DPMM 100 accordingly generates, and Address Translation Table 102 and Translation Lookaside Buffers 104 stores, logical to physical address translation information for parity information in the same manner as the logical to physical address translation information stored for data. For this reason, Address Translation Table 102 is represented as storing a Data Item Entry (DIE) 106 for each data item stored in Disks 16 wherein each DIE 106 includes a Data Address Translation Information (DATI) 108 and Parity Address Translation Information (PATI) 110 containing the information necessary for the logical to physical address translation of, respectively, data references and parity references. A reference to a data item in a Host Computer 10 operation will thereby result in Host Computer 10 providing the logical or virtual address, or reference, to the data item to DPMM 100 and, upon reading the corresponding DIE 106, DPMM 100 will obtain the information necessary to translate the data item logical address into a physical address of the data thereof, from the corresponding DATI 108, and into a physical address of the parity information thereof, from the corresponding PATI 110. In an analogous manner, Translation Lookaside Buffers 104 are shown as storing Physical Address Entries (PAES) 112 wherein each PAE 112 corresponds to a data item and contains the previously translated physical addresses of the data and parity information of the data item, respectively identified as a Vector Data Address 114 and a Vector Parity Address 116.

As described with regard to the allocation of physical address space on Disks 16 to logical addresses of data and parity information that, information regarding the formatting and storage capacities of Disks 16 and the assignments of disk space to logical addresses are stored in Disk Allocation Table 92 and that DPMM 100 references Disk Allocation Table 92 when constructing the DIE 106 entries relating a logical address of a data item to the physical addresses of the data and parity information contained therein. Unlike the logical to physical address mechanisms of the prior art, however, the system of the present invention does not assign logical addresses to physical disk space on a sector basis, but instead allocates logical addresses to disk space on a byte level, so that each DIE 106 entry contains the information necessary to translate a data item logical address into a corresponding data physical address and a corresponding parity information physical address at the byte level. This allocation of disk storage space on a byte basis by DPMM 100 is represented in FIG. 7 by Byte Allocation Logic 103 which, as indicated and as just discussed, operates within the address translation and assignment functions of DPMM 100 and with Address Translation Table 102 to assign disk storage space on a byte basis. The allocation of disk storage space on a byte basis thereby allows more flexible and more efficient use of disk storage space.

It is apparent, therefore, that although an item of data and its associated parity information are stored independently of one another, and may be read or written independently of one another, the data and parity information physical addresses of any data item are related through the address translation mechanism and its tables. It is also apparent that the physical addresses of a data item's data and parity information are dependent upon the actual Disks 16 that the information is stored upon and that, in turn, depends upon the allocation of Disks 16 to Data Set 90 and Parity Set 92. For this reason, DPMM 100 must generate the DATI 108 and PATI 110 for a data item and its associated parity information together when the data item is stored in Disks 16. The information necessary to generate each DATI 108 and related PATI 110 are, as is customary, contained in SDCU 94 and Disk Allocation Table 98 and DPMM 100 will access SDCU 94 and Disk Allocation Table 98 when generating a DATI 106 and associated PATI 108 for a given data item to determine the Disks 16 available to store the data and parity information and, from the Disk 16 storage, configuration, geometry and formatting information stored therein, the physical addresses at which the data and the associated parity information may be stored.

It should be noted that there need not be a direct one to one scaled relationship between physical addresses for data and physical addresses for the associated parity information as the relationship may be determined in a flexible manner from the information available in SDCU 94 and Disk Allocation Table 98. The generation of the DATI 108 and the PATI 110, and the generation of the corresponding translated Data Address 114 and the Vector Parity Address 116, for a data item are simplified, however, if storage assignments in the Disks 16 of Data Set 90 and Parity Set 92 are directly scaled to one another. For example, each Disk 16 of Parity Set 92 may be formatted to contain X items of parity information for each Y data items stored on a Disk 16 of Data Set 90, so that a PATI 110 and a Parity Vector Address 116 may be determined from the corresponding DATI 108 and Data Address 114 by adding a known scaling factor, or vector, to the address of the data to find the address of the associated parity information. It should be noted that the generation of a parity information address from a data address may be performed at the physical address level, that is, with the disk drive, track and sector identifications, or at the logical address level, depending upon the particular implementation of the invention.

Upon any data or parity information reference by Host Computer 10, therefore, and depending upon whether Host Computer 10 is performing a data operation or a parity operation, such as generating parity information or correcting a data error detected by means of the associated parity information. Host Computer 10 and the program or programs executing thereon provide the logical address of the data item to DPMM 100. The, Logical Address 117 is accompanied by a bit or bits, represented as Operation Code 118 comprised, for example of the operation instruction or a part thereof, indicating whether the operation is upon data or parity the invention.

Upon any data or parity information reference by Host Computer 10, therefore, and depending upon whether Host Computer 10 is performing a data operation or a parity operation, such as generating parity information or correcting a data error detected by means of the associated parity information. Host Computer 10 and the program or programs executing thereon provide the Logical Address 117 of the data item to DPMM 100. The Logical Address is accompanied by a bit or bits, represented as Operation Code 118 comprised, for example of the operation instruction or a part thereof, indicating whether the operation is upon data or parity information or, more usually in a parity operation, on both data and the associated parity information. DPMM 100 then provides the corresponding Data Address 114 and/or the associated Vector Parity Address 116 to Disk Controller 24 and Disk Platform 28, together with a corresponding disk operation command, and Disk Platform 28 performs the corresponding read or write of data or parity information or of both. These functions and operations are represented in FIG. 7 by Parity Operation Logic 119 in DPMM 100 and Parity Read/Write Logic 123 in Disk Platform 28. As described above, Parity Operation Logic 119 receives each Logical Address 117 and Operation Code 118 and generates a Parity Operation Signal 121 to Disk Platform 28 when a current operation requires a read or write of parity information. Parity Read/Write Logic 123 in turn responds to Parity Operation Signal 121 to control Disk Platform 28 to read or write parity information when required by a current operation.

It will be noted therefore, that the present invention provides a mechanism whereby data and parity information are stored and may be read independently of one another, so that parity information is read or written only when specifically required for an operation being executed by Host Computer 10 or by Disk Platform 28, thereby significantly reducing the volume of information read or written on each operation, and transferred over the buses of the system, and significantly increasing the speed of disk references.

Figure 8:
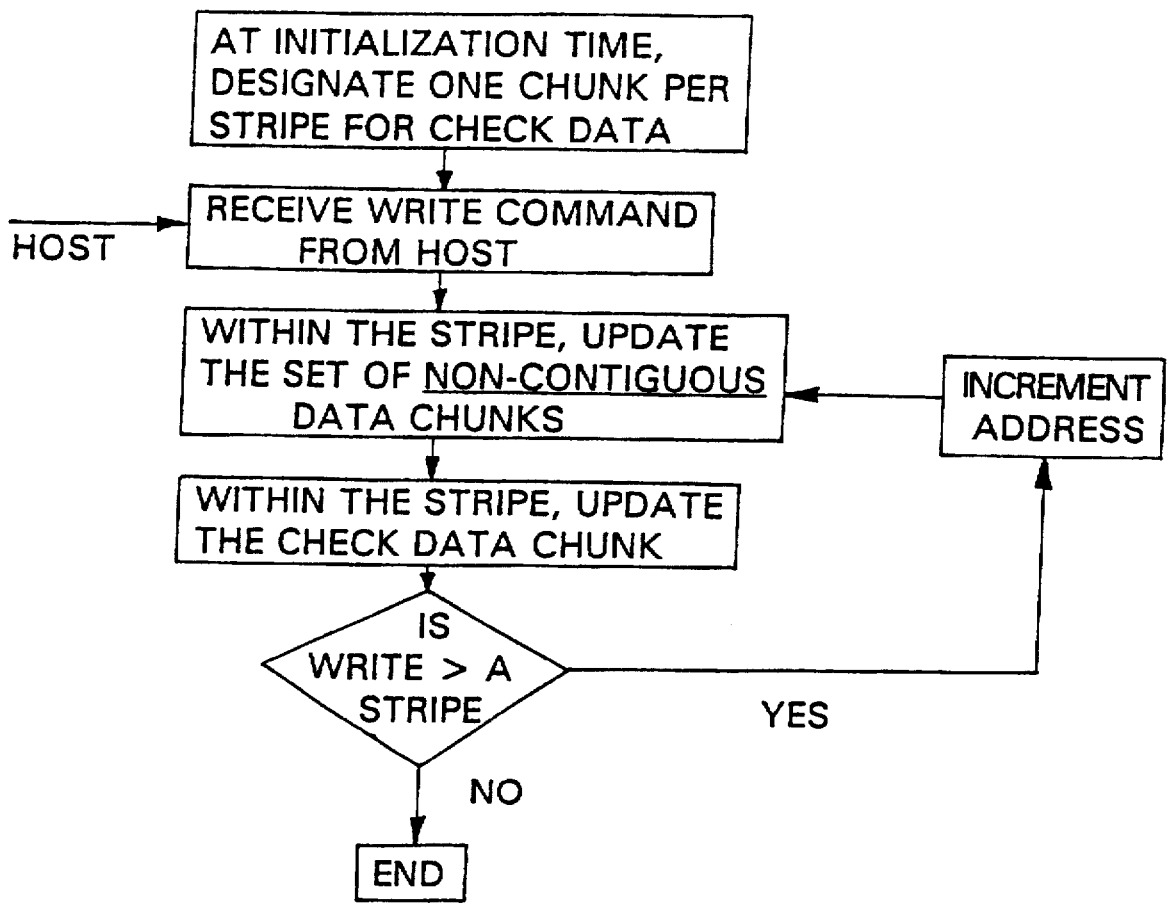
FIG. 8 is a diagrammatic representation of a RAID 5 prior art arrangement using Parity Striping.
Figure 9:
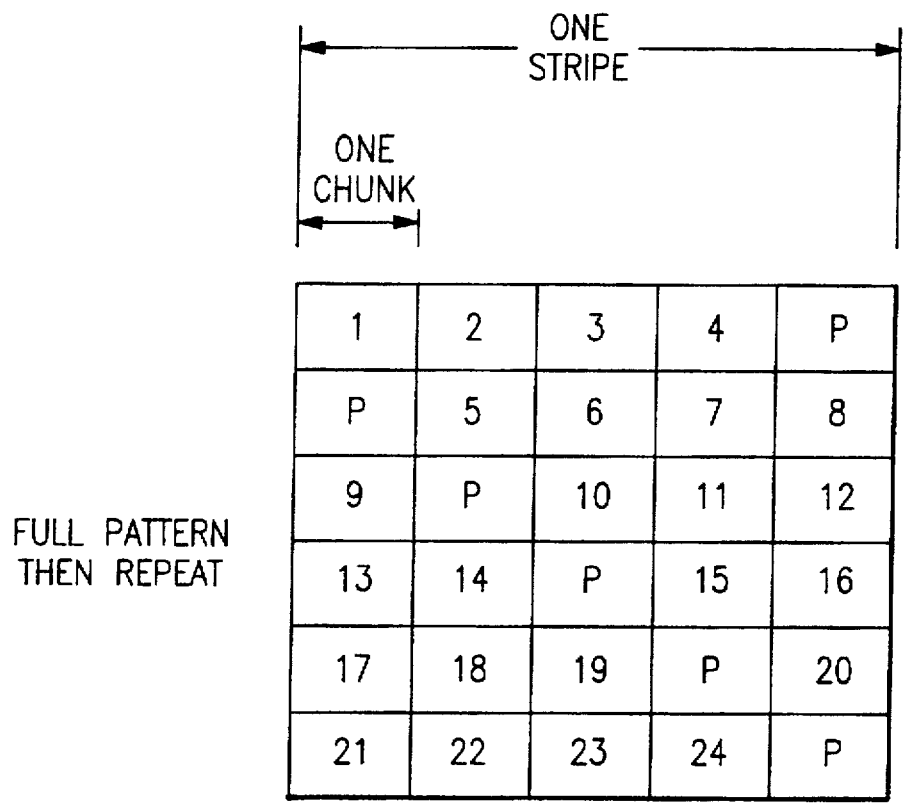
FIG. 9 is a table illustrating data and parity (P) information on one stripe of a storage disk of a RAID 5.

Finally, FIG. 8 illustrates the prior art method of parity striping according to RAID 5 while FIG. 9 illustrates the resulting arrangement of information on a disk by "stripes" and "chunks", as will be well understood by those of ordinary skill in the relevant arts. FIG. 10, in turn, illustrates the table vectored parity method of the present invention, comprising Steps 126 through 138 while the resulting pattern of information in on a disk storage space arranged as Cylinders 140 and by Stripes 142 comprised of Chunks 144 and the operation of the present invention, and the distinctions between the present invention as illustrated in FIGS. 10 and 11 and the prior art as illustrated in FIGS. 8 and 9, will be well understood by those of ordinary skill in the relevant arts.

It is to be understood that TVP is an option. If it were always a desired feature it would be automatically ingrained into the SOS. Not only can the user decide whether to invoke TVP or not, they can also decide the degree to which it should be enabled.

Having the option to vector the parity in a table controlled fashion will provide additional performance gains in many, but certainly not all, user applications. The objective here is to exploit those cases where TVP can provide gains, and simultaneously avoid those situations where use of a dedicated parity drive is preferred. The following compares the Parity Striping Approach and the Table Vectored Parity Approach:

| | |
|---|---|
| Parity Striping Approach: | Always enabled; must use on each and every disk all the time. |
| Table Vectored Parity Approach: | Optionally enabled or disabled; can be adjusted to the optimal number of disks storing parity. |
| Parity Striping Approach: | Delivers seek penalties for every READ operation on every disk. |
| Table Vectored Parity Approach: | Seek penalties occur on only those drives which store parity; all other drives are accessed penalty free. |
| Parity Striping Approach: | Has rotational delay inefficiencies due to data and parity sharing the same tracks. |
| Table Vectored Parity Approach: | Eliminates rotational delays penalties by sizing the parity deposits to track/ cylinders sizes. |
| Parity Striping Approach: | Striping size and parity striping are strongly coupled resulting in less flexibility and more inefficiency at lower granularity sizes. |
| Table Vectored Parity Approach: | Striping size and parity striping are unrelated resulting in more flexibility and more efficient operation. |
| Parity Striping Approach: | The smaller the block size access, the more rotational delays will be incurred. |
| Table Vectored Parity Approach: | Block access size has no negative impact on rotational delays. |
| Parity Striping Approach: | No efficiencies in scaling. |
| Table Vectored Parity Approach: | Able to exploit a more sophisticated system architecture to achieve scaleable performance increases. |

RAID 5 implies:
a) Check data size equals chunk size;
b) Check data chunk is within the stripe that it protects; and
c) Check data chunk size is unrelated to the physical drive characteristics.
TVP implies:
a) Check data size is an integral multiple or rotating disk parameter tracks/cylinders.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

I claim:

1. A mass storage mechanism for a system having mass storage devices for storing data items including data and parity information wherein the system includes a host processor including memory and disk management facilities and a disk platform connected from the host processor and controlling a plurality of disk drive units comprising the mass storage devices, the mass storage mechanism comprising:

a disk allocation mechanism for selectively allocating a data set of the plurality of disk drive units for storing the data and a parity set of the plurality of disk drive units for storing the associated parity information and for storing information regarding the allocation and capacities of the plurality of disk drive units, and a memory management mechanism is responsive to the disk allocation information stored in a disk allocation table for performing logical to physical address translation operations, including generating and storing a logical to physical address translation entry for and corresponding to each logical address of a data item, each physical address translation entry including information for translating a logical address of a data item into a physical data address of the data thereof and a physical parity address of the parity information thereof, whereby the parity information associated with a data item is stored separately and independently of the data associated with the data item, and responsive to each logical address received from the host computer and to a corresponding command code indicating whether a current operation of the host computer is a parity information operation for providing the physical data address, and the physical parity information address when the current operation is a parity information operation, wherein the disk platform is responsive to a physical data address and to a physical parity information address for performing a corresponding disk operation, whereby the parity information associated with a data item is retrieved only if the current operation requires the parity information.

2. A mass storage mechanism for a system having mass storage devices for storing data items including data and parity information wherein the system includes a host processor including memory and disk management facilities and a disk platform connected from the host processor and controlling a plurality of disk drive units comprising the mass storage devices, the mass storage mechanism comprising:

a disk allocation mechanism for selectively allocating a data set of the plurality of disk drive units for storing the data and a parity set of the plurality of disk drive units for storing the associated parity information and for storing information regarding the allocation and capacities of the plurality of disk drive units, and a memory management mechanism is responsive to the disk allocation information stored in a disk allocation table for performing logical to physical address translation operations, including generating and storing a logical to physical address translation entry for and corresponding to each logical address of a data item each physical address translation entry including information for translating a logical address of a data item into a physical data address of the data thereof and a physical parity address of the parity information thereof, whereby the parity information associated with a data item is stored separately and independently of the data associated with the data item, and responsive to each logical address received from the host computer and to a corresponding command code indicating whether a current operation of the host computer is a parity information operation for providing the physical data address, and the physical parity information address when the current operation is a parity information operation, wherein the disk platform is responsive to a physical data address and to a physical parity information address for performing a corresponding disk operation, whereby the parity information associated with a data item is retrieved only if the current operation requires the parity information, and wherein the memory management mechanism further includes a lookaside buffer for storing and providing the physical data address corresponding to a previously translated logical address.

3. A mass storage mechanism for a system having mass storage devices for storing data items including data and parity information wherein the system includes a host processor including memory and disk management facilities and a disk platform connected from the host processor and controlling a plurality of disk drive units comprising the mass storage devices, the mass storage mechanism comprising:

a disk allocation mechanism for selectively allocating a data set of the plurality of disk drive units for storing the data and a parity set of the plurality of disk drive units for storing the associated parity information and for storing information regarding the allocation and capacities of the plurality of disk drive units, and a memory management mechanism is responsive to the disk allocation information stored in a disk allocation table for performing logical to physical address translation operations, including generating and storing a logical to physical address translation entry for and corresponding to each logical address of a data item, each physical address translation entry including information for translating a logical address of a data item into a physical data address of the data thereof and a physical parity address of the parity information thereof, whereby the parity information associated with a data item is stored separately and independently of the data associated with the data item, and responsive to each logical address received from the host computer and to a corresponding command code indicating whether a current operation of the host computer is a parity information operation for providing the physical data address, and the physical parity information address when the current operation is a parity information operation, wherein the disk platform is responsive to a physical data address and to a physical parity information address for performing a corresponding disk operation, whereby the parity information associated with a data item is retrieved only if the current operation requires the parity information, and wherein the disk allocation mechanism assigns disk physical storage space to corresponding logical addresses on a per byte basis.

4. For use in a mass storage mechanism for a system having mass storage devices for storing data items including data and parity information wherein the system includes a host processor including memory and disk management facilities and a disk platform connected from the host processor and controlling a plurality of disk drive units comprising the mass storage devices, a method for storing the data and the parity information associated with each data item, comprising the steps of:

by operation of a disk allocation mechanism, selectively allocating a data set of the plurality of disk drive units for storing the data and a parity set of the plurality of disk drive units for storing the associated parity information and for storing information regarding the allocation and capacities of the plurality of disk drive units, by operation of a memory management mechanism responsive to the disk allocation information stored in a disk allocation table and to logical addresses provided from the host computer, performing logical to physical address translation operations by generating and storing a logical to physical address translation entry for and corresponding to each logical address of a data item, each physical address translation entry including information for translating a logical address of a data item into a physical data address of the data thereof and a physical parity address of the parity information thereof, whereby the parity information associated with a data item is stored separately and independently of the data associated with the data item, and in response to each logical address received from the host computer and to a corresponding command code indicating whether a current operation of the host computer is a parity information operation, providing to the disk platform the physical data address, and the physical parity information address when the current operation is a parity information operation, the disk platform being responsive to a physical data address and to a physical parity information address for performing a corresponding disk operation, whereby the parity information associated with a data item is retrieved only if the current operation requires the parity information.

5. For use in a mass storage mechanism for a system having mass storage devices for storing data items including data and parity information wherein the system includes a host processor including memory and disk management facilities and a disk platform connected from the host processor and controlling a plurality of disk drive units comprising the mass storage devices, a method for storing the data and the parity information associated with each data item, comprising the steps of:

by operation of a disk allocation mechanism, selectively allocating a data set of the plurality of disk drive units for storing the data and a parity set of the plurality of disk drive units for storing the associated parity information and for storing information regarding the allocation and capacities of the plurality of disk drive units, by operation of a memory management mechanism responsive to the disk allocation information stored in a disk allocation table and to logical addresses provided from the host computer, performing logical to physical address translation operations by
generating and storing a logical to physical address translation entry for and corresponding to each logical address of a data item, each physical address translation entry including information for translating a logical address of a data item into a physical data address of the data thereof and a physical parity address of the parity information thereof,
whereby the parity information associated with a data item is stored separately and independently of the data associated with the data item, and
in response to each logical address received from the host computer and to a corresponding command code indicating whether a current operation of the host computer is a parity information operation, providing to the disk platform
the physical data address, and
the physical parity information address when the current operation is a parity information operation,
the disk platform being responsive to a physical data address and to a physical parity information address for performing a corresponding disk operation, whereby the parity information associated with a data item is retrieved only if the current operation requires the parity information, and
wherein the memory management mechanism further includes a lookaside buffer for storing and providing a physical address corresponding to a previously translated logical addresses.

6. For use in a mass storage mechanism for a system having mass storage devices for storing data items including data and parity information wherein the system includes a host processor including memory and disk management facilities and a disk platform connected from the host processor and controlling a plurality of disk drive units comprising the mass storage devices, a method for storing the data and the parity information associated with each data item comprising the steps of:

by operation of a disk allocation mechanism, selectively allocating a data set of the plurality of disk drive units for storing the data and a parity set of the plurality of disk drive units for storing the associated parity information and for storing information regarding the allocation and capacities of the plurality of disk drive units, by operation of a memory management mechanism responsive to the disk allocation information stored in a disk allocation table and to logical addresses provided from the host computer, performing logical to physical address translation operations by
generating and storing a logical to physical address translation entry for and corresponding to each logical address of a data item, each physical address translation entry including information for translating a logical address of a data item into a physical data address of the data thereof and a physical parity address of the parity information thereof,
whereby the parity information associated with a data item is stored separately and independently of the data associated with the data item, and
in response to each logical address received from the host computer and to a corresponding command code indicating whether a current operation of the host computer is a parity information operation, providing to the disk platform
the physical data address, and
the physical parity information address when the current operation is a parity information operation,
the disk platform being responsive to a physical data address and to a physical parity information address for performing a corresponding disk operation, whereby the parity information associated with a data item is retrieved only if the current operation requires the parity information, and
wherein the disk allocation mechanism assigns disk physical storage space to corresponding logical addresses on a per byte basis.

* * * * *